US009445050B2

(12) United States Patent
Travis et al.

(10) Patent No.: US 9,445,050 B2
(45) Date of Patent: Sep. 13, 2016

(54) TELECONFERENCING ENVIRONMENT HAVING AUDITORY AND VISUAL CUES

(71) Applicant: FREESCALE SEMICONDUCTOR, INC., Austin, TX (US)

(72) Inventors: Edward O. Travis, Austin, TX (US); Douglas M. Reber, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/543,031

(22) Filed: Nov. 17, 2014

(65) Prior Publication Data

US 2016/0142674 A1 May 19, 2016

(51) Int. Cl.
  H04N 7/14 (2006.01)
  H04N 7/15 (2006.01)
  H04L 29/06 (2006.01)
  G10L 17/00 (2013.01)

(52) U.S. Cl.
  CPC .............. *H04N 7/15* (2013.01); *G10L 17/005* (2013.01); *H04L 65/403* (2013.01); *H04N 7/147* (2013.01)

(58) Field of Classification Search
  CPC ........................................................ H04N 7/14
  USPC .............. 379/93.21, 158, 202.01; 348/14.01, 348/14.03, 14.07, 14.08
  See application file for complete search history.

(56) References Cited

U.S. PATENT DOCUMENTS

| | | | | |
|---|---|---|---|---|
| 7,489,772 B2* | 2/2009 | Szomolanyi | ........ | H04L 12/1822 379/158 |
| 7,768,543 B2* | 8/2010 | Christiansen | ..... | H04L 29/06027 348/14.08 |
| 9,088,688 B2* | 7/2015 | Krans | .................... | H04N 7/142 |
| 2004/0013252 A1* | 1/2004 | Craner | ................. | H04M 1/247 379/142.01 |
| 2008/0252637 A1* | 10/2008 | Berndt | .................... | G06T 19/00 345/419 |
| 2013/0155169 A1* | 6/2013 | Hoover | ................. | H04N 7/157 348/14.02 |

OTHER PUBLICATIONS

Gemmell, J. et al., "Gaze Awareness for Video-conferencing: A Software Approach", IEEE Computer Society, vol. 7, Issue 4, Oct.-Dec. 2000, pp. 26-35.
Atzpadin, N. et al., "Stereo Analysis by Hybrid Recursive Matching for Real-Time Immersive Video Conferencing", IEEE Transactions on Circuits and Systems for Video Technology, Mar. 2004, vol. 14, Issue 3, pp. 321-334.
Goldberg, S. et al., "Stereo Vision and Rover Navigation Software for Planetary Exploration", IEEE Aerospace Conference Proceedings, 2002, vol. 5, pp. 5-2025-5-2036.

\* cited by examiner

*Primary Examiner* — Olisa Anwah (57) ABSTRACT

A teleconferencing environment is provided in which both audio and visual cues are used to identify active participants and presenters. Embodiments provide an artificial environment, configurable by each participant in a teleconference, that directs the attention of a user to an identifier of an active participant or presenter. This direction is provided, in part, by stereo-enhanced audio that is associated with a position of a visual identifier of an active participant or presenter that has been placed on a window of a computer screen. The direction is also provided, in part, by promotion and demotion of attendees between attendee, active participant, and current presenter and automatic placement of an image related to an attendee on the screen in response to such promotion and demotion.

9 Claims, 7 Drawing Sheets

TELECONFERENCING ENVIRONMENT HAVING AUDITORY AND VISUAL CUES

BACKGROUND

1. Field

This disclosure relates generally to teleconferencing, and more specifically, to providing a configurable teleconferencing environment that provides visual and auditory cues as to current speakers.

2. Related Art

In spite of the increased use of video conferencing, either via specialized systems or desktop computers, the majority of teleconferences continue to be provided in a purely audio environment. One difficulty in participating in an audio teleconference having a large number of attendees is distinguishing between each presenter, as voices can become distorted over phone lines and voice-over-IP implementations. It is therefore desirable to have a mechanism by which a presenter in a teleconference can be easily and quickly identified to each participant in the teleconference.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The figures are not necessarily drawn to scale.

DETAILED DESCRIPTION

Embodiments of the present invention provide a teleconferencing environment in which both audio and visual cues are used to identify active participants and presenters. Embodiments provide an artificial environment, configurable by each participant in a teleconference, that directs the attention of a user to an identifier of an active participant or presenter. This direction is provided, in part, by stereo-enhanced audio that is associated with a position of a visual identifier of an active participant or presenter that has been placed on a window of a computer screen. The direction is also provided, in part, by promotion and demotion of attendees between attendee, active participant, and current presenter and automatic placement of an image related to an attendee on the screen in response to such promotion and demotion.

When multiple attendees are speaking during a teleconference, it is often difficult to distinguish who is speaking unless a listener is familiar with each attendee's voice and accent. It may be important to know who is speaking in a large teleconference, so that a listener knows what the speaker's role is, how qualified they are, or how important that person is. Embodiments of the present invention make use of a listener's natural ability to locate the source of a sound to identify a presenter by connecting the presenter's voice to a position on a computer screen where a visual identifier is located. It can also be difficult to determine which part of a slide presentation to focus upon when a presenter is speaking. Embodiments of the present invention make use of visual cues to enable attendees to better focus on presentations.

Figure 1:
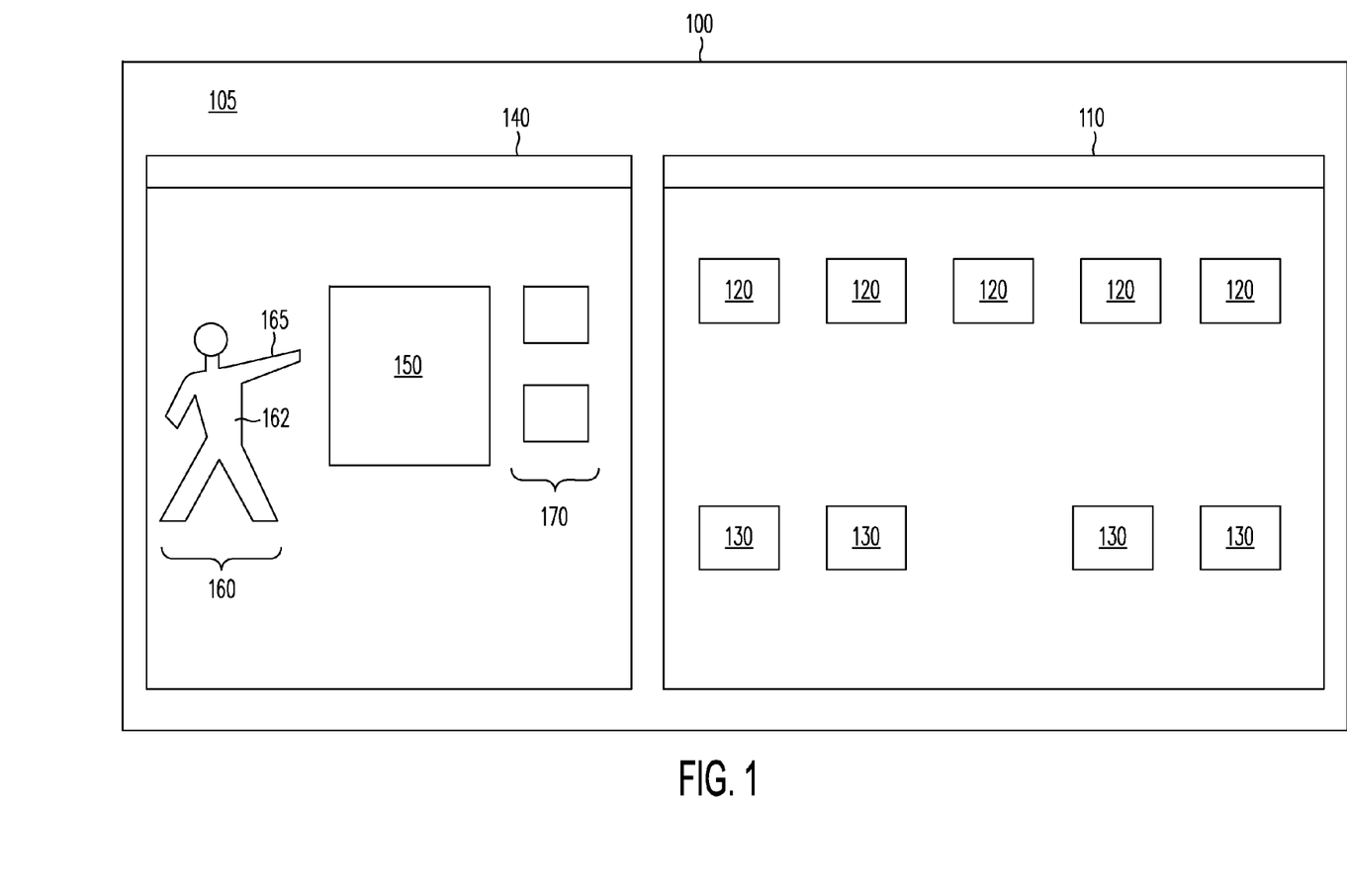
FIG. 1 is a simplified block diagram illustrating a teleconference environment to aid in identifying participants in the teleconference, in accord with embodiments of the present invention.

FIG. 1 is a simplified block diagram illustrating a teleconference environment 105 displayed on computer screen 100 to aid in identifying participants in the teleconference. In the illustrated example, teleconference environment 105 includes two windows: an attendee window 110 and a presenter window 140. In an alternative embodiment, a single window could be generated with two parts, one providing the attendee window information and the other providing the presenter window information. In another alternative embodiment, more than two windows can be generated, which can provide, for example, information related to presenters, active participants, and attendees.

Attendee window 110 includes, as an example, two sets of images 120 and 130 representing attendees in an active teleconference. As will be discussed in more detail below, images 120 and 130 can be placed by a user of the teleconference environment per personal preference. For example, attendees that are more familiar to the user can be placed (e.g., by mouse click and drag) in the set of top images (120), and less familiar attendee images or attendees whose voices are more difficult to distinguish can be placed spaced apart in the set of lower images (130).

Attendee window 110 can be thought of as an auditorium, with image set 120 being a back row and image set 130 being a front row. As will be discussed in greater detail below, when an attendee speaks, the monaural audio signal provided from the speaker can be used to generate a stereo signal that is enhanced to appear to be generated from the location of the image in attendee window 110. For example, sound from a speaker whose image is toward the left of the screen will sound as if the sound is coming from the left of the user, and sound from a speaker whose image is toward the right of the screen will sound as if the sound is coming from the right of the screen. Further, if the speaker is in the "back row" (e.g., image set 120), reverb or echo effects can be added to provide depth.

Presenter window 140, as illustrated, includes three areas: a slide area 150, a presenter area 160, and an active participant area 170. Slide area 150 is configured to display slide image information provided by a presenter. Presenter area 160 provides an avatar image 162 associated with a teleconference attendee who is the current presenter. In one embodiment, the avatar image can be animated to provide a visual cue 165 as to what area of a slide presented in slide area 150 is being discussed. Data related to visual cue 165 is provided by the presenter through an input device such as a mouse, a touch screen, a touch pad, an input pen, and the like. Active participant area 170 includes images associated with each active participant in the teleconference.

Attendees can be promoted and demoted between current presenter, active participant, and attendee, as their involvement in the teleconference changes. In response, their images can move between current presenter area 160 and active participant area 170, or off the presenter window entirely. This promotion and demotion will be discussed in greater detail below.

Embodiments of the teleconference environment can include one or both of attendee window 110 and presenter window 140, depending upon the nature of the teleconferences being displayed, and user preference.

Figure 2:
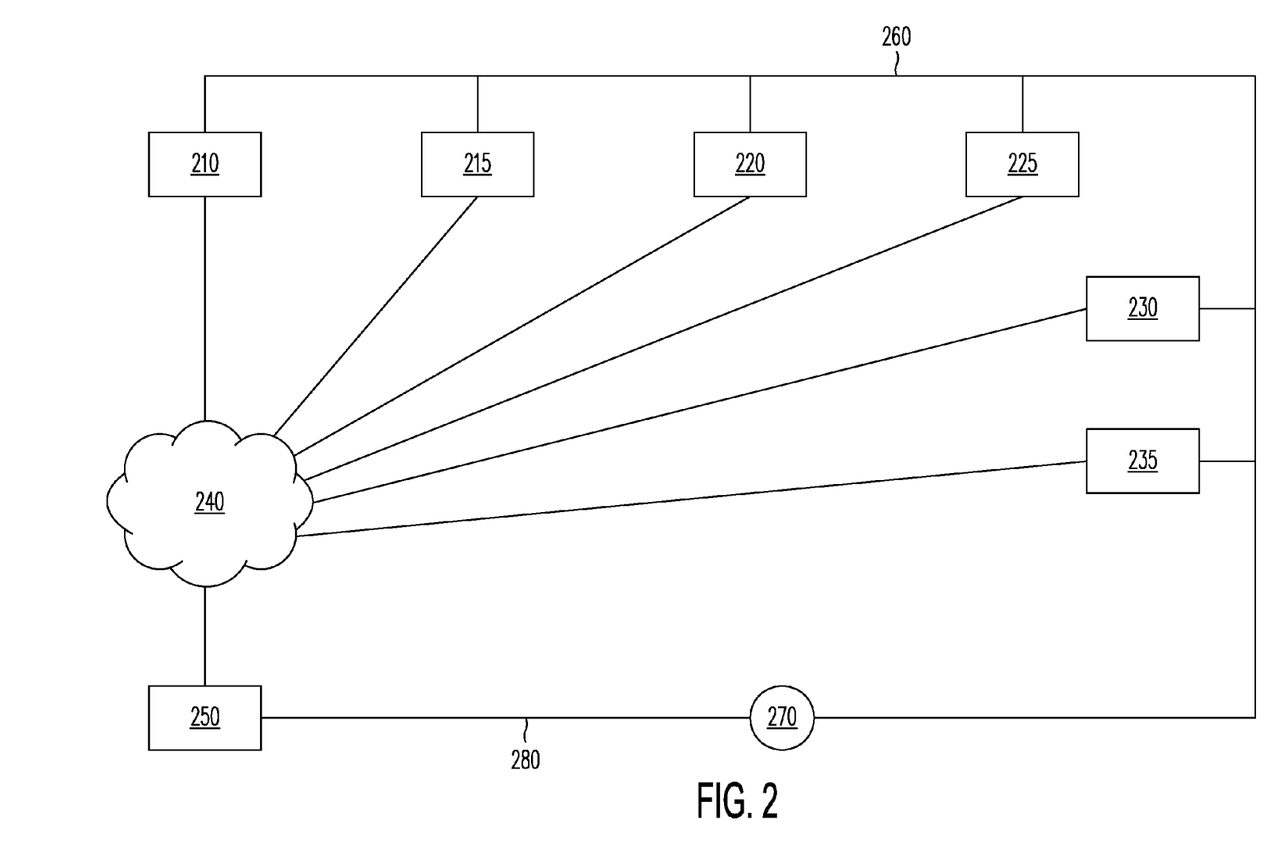
FIG. 2 is a simplified block diagram illustrating a network of teleconference attendees, usable in association with embodiments of the present invention.

FIG. 2 is a simplified block diagram illustrating a network of teleconference attendees, usable in association with embodiments of the present invention. Attendee sites 210, 215, 220, 225, 230, and 235 each include a computer coupled to a teleconference server 250 via a network 240. Network 240 can be a wide area network or local area network. Attendee site computers can be coupled to the network either directly, or via one or more routers. As will be discussed in greater detail below, teleconference server 250 is configured to aggregate information related to the participants in a teleconference and then transmit analysis of that information to each participant attendee site computer. Teleconference server 250 is further configured to receive audio signals related to the conference via network 240, slide data from a presenter, and other data from attendee site computers. This "other data" can include, for example, mouse movement information associated with an active participant.

In addition to exchange of audio data over the computer network, teleconference server 250 can be coupled to a telephone system switch or server 270 via a coupling line 280. Telephone switch or server 270 can be coupled to each of the attendee sites via, for example, a POTS line 260 or other telephone system signal coupling. In this manner, multiple modes of communication can be provided. Teleconference server 250 can associate incoming telephone connection identifiers with attendees in the teleconference, so that when a person speaks on the telephone, an identifier related to that attendee can be provided to each other attendee.

For each teleconference, teleconference server 250 can allocate resources such as memory, input/output slots, processing, and security. The teleconference server will associate an identifier with each attendee in a teleconference, and provide that identifier to each attendee. As will be discussed in more detail below, the teleconference server will identify and track those attendees who are active participants in the teleconference. The teleconference server can also rank attendees as attendees, active participants, and current presenters, based upon a level of participation in the teleconference. For example, if an attendee begins to speak, and the time or frequency of speaking crosses a threshold, then the attendee can move from an attendee status to an active participant. Further, should the attendee continue to talk or talk and also provide gesture input (e.g., through mouse movement), that attendee can be further promoted to current presenter status should they cross a higher threshold. Similarly, current presenters or active participants can be demoted should their speaking frequency drop below another threshold. These levels of participation can be provided to all attendees, so that the teleconference environment displays can provide that status information as well as audio. Teleconference server 250 can also provide the audio for the conference to each attendee through network 240. In some embodiments, a current presenter activity threshold can be set such that there can be more than one current presenter at a time. In such embodiments, the display can be configured to display all current presenters as active participants.

Figure 3:
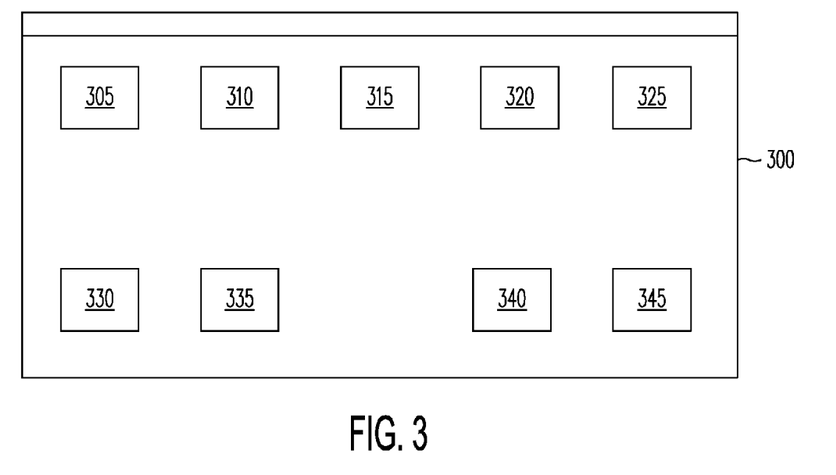
FIG. 3 is a simplified block diagram illustrating an example embodiment of an attendee window, in accord with an embodiment of the present invention.

FIG. 3 is a simplified block diagram illustrating an example embodiment of an attendee window 300, in accord with an embodiment of the present invention. Attendee window 300 can be thought of as providing an analog to auditorium seating. Attendee images 305, 310, 315, 320, and 325 are in the "back row" of the auditorium ("back row attendees"), while attendee images 330, 335, 340, and 345 are in the "front row" ("front row attendees"). Once identification information related to each attendee is provided to a computer at an attendee site, the user of the computer can arrange the attendees as they see fit. This choice can be made in light of how the user wishes to differentiate each attendee as the teleconference proceeds.

As discussed above, embodiments of the present invention modify attendee voice audio in accord with the placement of the images associated with the attendee. Each attendee can arrange the images by role, physical location, department, or familiarity, for example. Incoming monaural (single-channel) audio signals are converted to stereo signals and the channels are modified to sound like the voice is coming from a region of the screen in which the associated image is located. This conversion to stereo audio signals can be done by time shifting one channel or the other to take advantage of human beings' natural ability to determine a left-to-right location of a source of a sound (e.g., head-related transfer function involving sound filtering). A three-dimensional sound effect can also be generated using not only time shifting, but also reverberation or echo effects to add depth, and thereby provide vertical position cues to place the "speaker" in the front or back row. Given the two-dimensional nature of a computer screen, it may be determined that only left-to-right cue information is desirable to distinguish between speakers, rather than including the depth cueing suggested above. Once the stereo audio signal is generated, it can be provided to a sound card or other audio output device to be played to the user.

In this manner, a user can configure an artificial environment in which they chose how the participants are positioned in the window. Then when an attendee speaks, the system associates the sounds with that attendee by spatially adjusting the sounds to correspond to the user's chosen locations on the screen for the attendee who is speaking. Each attendee therefore can individually tailor their environment.

Figure 4:
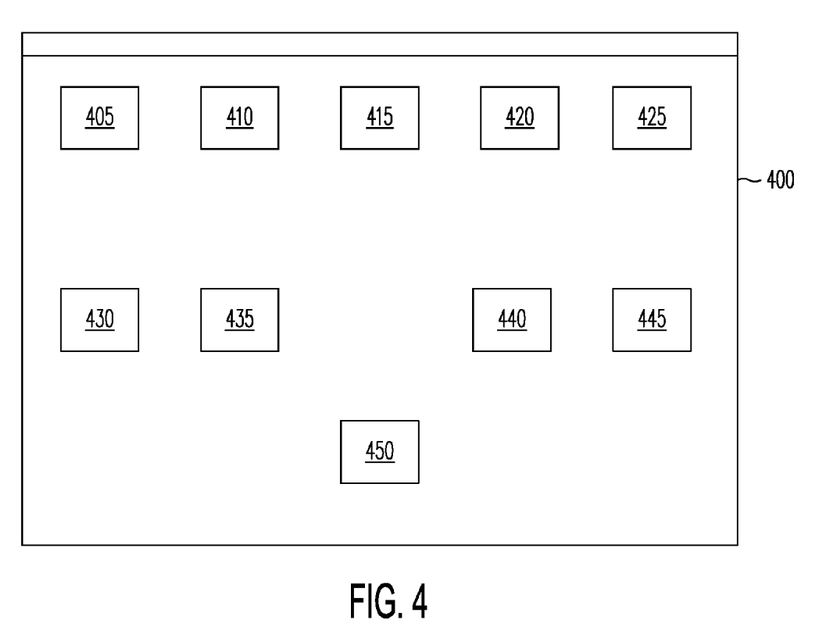
FIG. 4 is a simplified block diagram illustrating another example embodiment of an attendee window, in accord with an embodiment of the present invention.

FIG. 4 is a simplified block diagram illustrating another example embodiment of an attendee window 400, in accord with an embodiment of the present invention. In this embodiment, attendees are also arranged in an auditorium format (i.e., attendees 405, 410, 415, 420, and 425 in the "back row" and attendees 430, 435, 440, and 445 in the "front row"). In addition, a "stage" is provided to which the current presenter 450 or most active participant(s) are moved. The system will according adjust the sound location to correspond to the speaker on the stage. The current presenter or most active participants can be determined through use of the attendee ranking received from the teleconference server, as discussed above.

Figure 5:
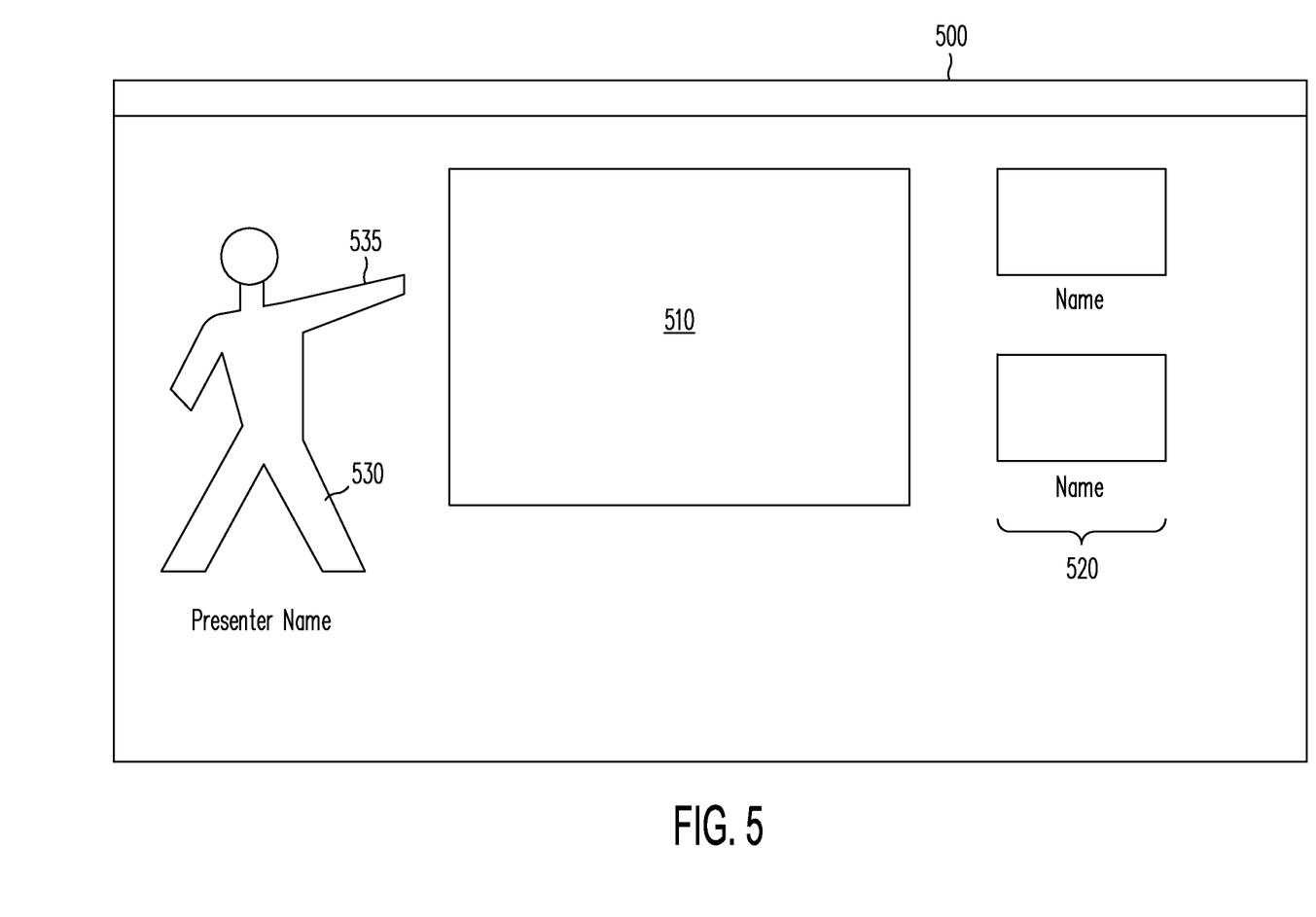
FIG. 5 is a simplified block diagram illustrating an example embodiment of a presenter window, in accord with an embodiment of the present invention.

FIG. 5 is a simplified block diagram illustrating an example embodiment of a presenter window 500, in accord with an embodiment of the present invention. The presenter window is configured to give visual cues in the teleconference environment to better enable an attendee of a teleconference to understand who is currently presenting and what they are current presenting. There are three main portions of presenter window 500: a presentation area 510, active participant area 520, and current presenter area 530. Slide area 510 displays presentation data provided by the current presenter to the teleconference server (e.g., teleconference server 250). Presentation data can be provided in a number of formats, including slides, postscript files, picture files, desktop images, and the like. Typically, presentation data originates on a presenter's screen and is transmitted by the teleconference environment to teleconference server 250. As discussed above, the teleconference server can provide the presentation data to each attendee site computer. Once received by an attendee site computer, the presentation data is sized for display in slide area 510.

As discussed above, teleconference server 250 can track all attendees to a teleconference and determine which attendees are active participants. Designation as an active participant can be determined by an amount of time speaking by an attendee, or a frequency of speaking over a period of time by an attendee, for example. If the amount of time speaking or the frequency of speaking exceeds an active participant threshold, then the attendee is designated as an active attendee by the teleconference server. Identification information related to current active participants can be provided by the teleconference server to the attendee site computers. Once the information related to the current active participants is received, the attendee site computers can display identifiers of those current active participants in active participant area 520. The identifiers can include, for example, textual identifiers of user names, pictures of the users, or avatars. In some embodiments, the active participants can be displayed with the most recently promoted active participant on the top of the area. Alternatively, the teleconference server can track and rank active participant activity, and provide that ranking information to the attendee site computers. Using that ranking information, the active participants can be displayed in ranked order within active participant area 520.

Teleconference server 250 can also track all attendees to a teleconference and determine which attendee is the current presenter. Typically, the current presenter will be associated with the attendee site that is providing the presentation data displayed in presentation area 510. In some embodiments, the current presenter can be locked to that attendee providing the presentation data. In other embodiments, the current presenter can initially default to the attendee providing the presentation data, but can switch off to another attendee should that attendee participation exceed a current presenter threshold. As with the determination of the currently active participants, time speaking or frequency of speaking of active participants can be judged against the current presenter threshold to determine whether any of the active participants is speaking at a level to displace the previous presenter as the current presenter. In some embodiments, the current presenter threshold can also be judged against movement of an input device over presentation area 510 (e.g., a mouse, touch screen, and the like). A combination of speaking and input device movement can be used to promote an attendee to a current presenter ranking.

Once a current presenter ranking has been assigned by teleconference server 250, identification information regarding the current presenter can be provided to the attendee site computers. The attendee site computer can then display an identifier of the current presenter in current presenter area 530. In some embodiments, the identifier of the current presenter can be an avatar 535, as illustrated. Alternatively, an image such as a picture of the presenter can be provided.

Further, as discussed above, a current presenter can be determined by movement of an input device over that user's presentation area. The location of the input device movement in the region of their presentation area can be provided to the teleconference server. The teleconference server can provide that information to the attendee site computers. This location information can be used by the teleconferencing environment to be indicated in the presenter window. In one embodiment, an "arm" of the presenter's avatar 535 can be extended to "point" toward the region of the presentation area 510 that is being indicated by the current presenter. In this manner, visual cues are provided to the attendee using the teleconferencing environment of not only who is currently presenting, but also what specifically they are referencing during their presentation. As illustrated, the "arm" of the presenter's avatar reaches partially toward the indicated region of the presentation area. In other embodiments, the presenter's arm can extend fully over the presentation area to the indicated region (e.g., over a bullet point in a slide).

Figure 6:
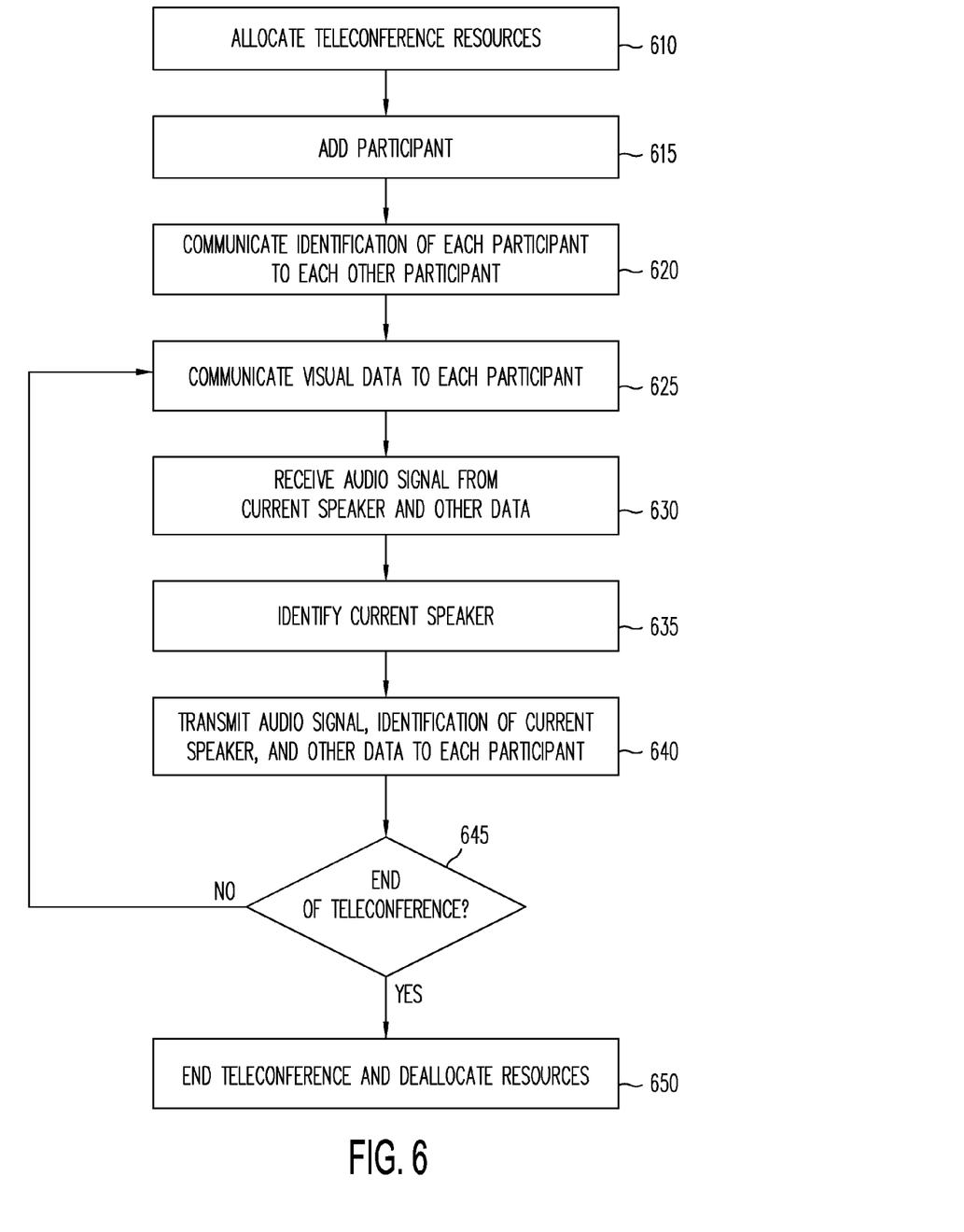
FIG. 6 is a simplified flow diagram illustrating steps performed by a teleconferencing server during a teleconference, in accord with embodiments of the present invention.

FIG. 6 is a simplified flow diagram illustrating steps performed by a teleconferencing server during a teleconference, in accord with embodiments of the present invention. Upon receiving indication that a teleconference is desired to be set up, the teleconferencing server can allocate the appropriate resources to support a teleconference (610). These resources can include, for example, memory, input/output slots on the server to communicate with all the attendee site computers and the telephone switch or server (e.g., 270), processing resources (e.g., virtual machines and the like), and security resources. Security resources for the teleconference server are desirable to ensure isolation of the various teleconferences being supported by the teleconference server at any time.

Once resources are allocated for a teleconference, attendees to the teleconference can be added (615). Adding attendees includes associating a computer network connection with an attendee and associating a phone line connection with an attendee, if any phone line connection is made. In one embodiment, adding attendees includes steps in which attendees identify themselves to the teleconference server. In alternative embodiments, the teleconference server can maintain records of computer connections/phone number connections associated with attendee identifiers so that attendees do not have to identify themselves on any but the first time they connect with the teleconference server.

As attendees connect to a teleconference and are identified, identifiers of the attendees can be communicated to each other attendee (620). As discussed above, those identifiers can be used to display attendee identifier information to the various attendees. A presenter for the teleconference can communicate visual data to the teleconference server for display in each attendee's teleconference environment (e.g., in presenter window 500). This visual data can be communicated to each attendee (625). As that visual data is refreshed or changed, the new information can likewise be provided to each attendee.

An attendee can speak and that audio information is received via network or phone connections by the teleconference server (630). In addition, any visual input data from the attendee (e.g., mouse movement over the slide, or new slides) can be received by the teleconference server. The teleconference server can identify the source of the audio signal or other data (635) through the previous correlation between the network lines or telephone lines and the attendee identifiers. As the teleconference server identifies the source of an audio signal or other data, the teleconference server can also make a threshold determination as to whether the speaker should be considered an active participant or a current presenter. As discussed above, differing thresholds for time speaking or frequency of speaking can be associated with differing categories of participation in a teleconference. A first level of participation can be as an attendee, which can be a person who is present at the teleconference but contributes little else. A second level of participation can be as an active participant, which can be a person who periodically provides spoken input to the teleconference. A third level of participation can be as a current presenter, which can be a person who is the primary spoken and gestural data contributor to the teleconference. There can be one threshold of participation to be elevated to a particular level of participation, and another threshold of participation to be relegated down from a particular level of participation.

As the teleconference server identifies the source of an audio signal, the teleconference server can transmit the audio signal and the identification of the current speaker providing the audio signal, and the other data (e.g., input device movement data), along with participation level information for the identified source of audio signal, to each attendee in the teleconference (640). This receipt and communication of information from and to the attendees of the teleconference continues until the end of the teleconference occurs (645). At this point, the teleconference server can end the teleconference by terminating the input/output connections to the attendee sites and de-allocating resources dedicated to the teleconference.

Figure 7:
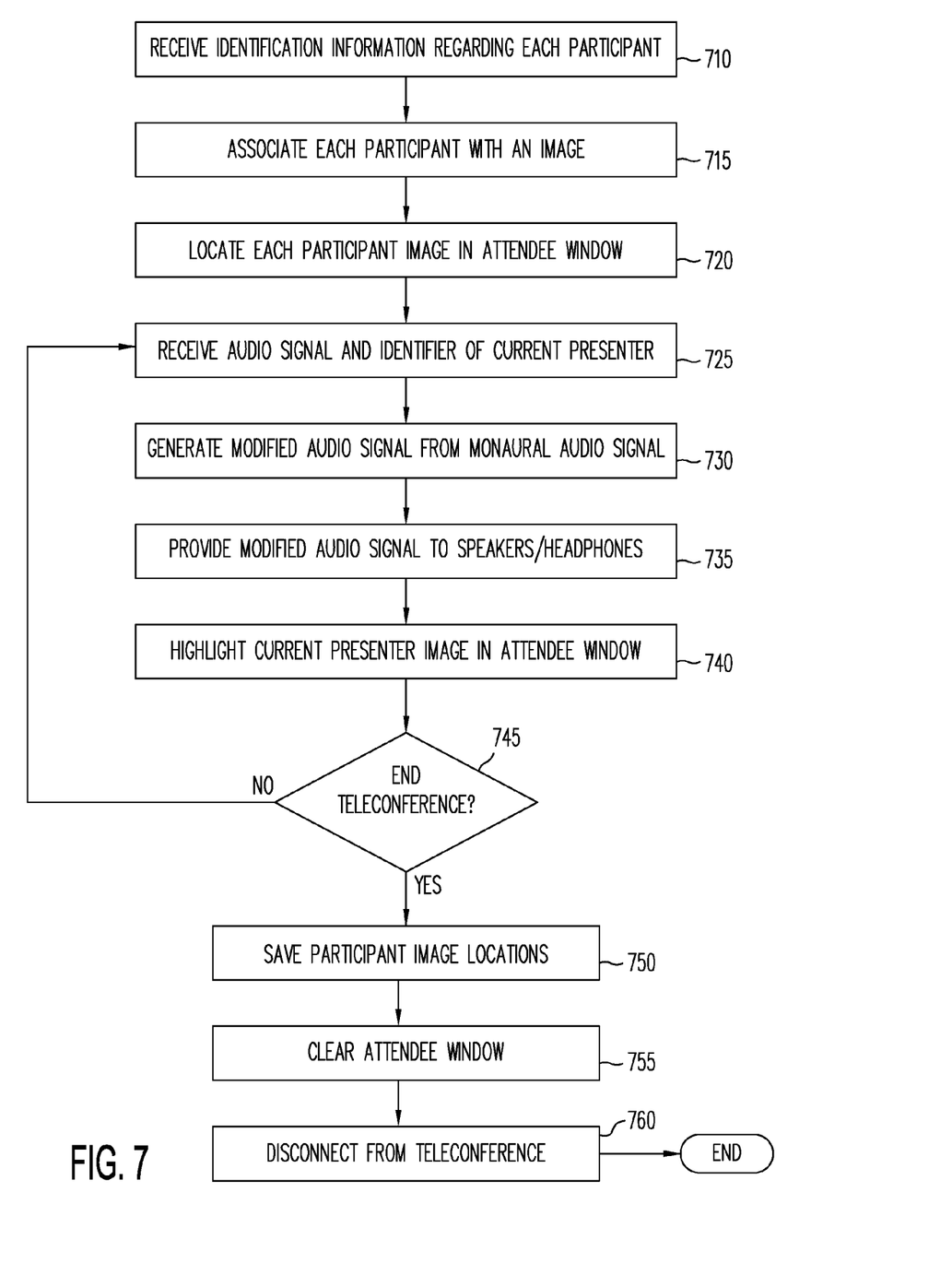
FIG. 7 is a simplified flow diagram illustrating steps performed by a teleconference environment displaying an attendee window, in accord with embodiments of the present invention.

FIG. 7 is a simplified flow diagram illustrating steps performed by a teleconference environment displaying an attendee window, in accord with embodiments of the present invention. After a teleconference has been established, the teleconference environment at an attendee site computer receives identification information regarding each attendee to the teleconference from the teleconference server (710). The teleconference environment can then associate each identified attendee with an image (715). This can be done automatically, by referencing a local or remote database that includes images chosen by either the attendees themselves or the local attendee to correlate with the identified attendees. The images of the attendees can then be located in an attendee window (e.g., attendee window 300 or 400) (720). Location of the attendee images can be performed automatically by the attendee's local computer (e.g., alphabetically, by group, or using stored location information from a previous teleconference) or by the attendee according to personal preference.

The attendee site computer can receive audio signals and associated source identifiers of the current presenter from the teleconference server (725). A modified audio signal, such as a stereo audio signal, can then be generated from the received monaural audio signal (730). The modified audio signal can be generated such that a perceived spatial dimension is created that corresponds to the image of the associated attendee who is the source of the audio signal. An appropriate delay to one channel or the other of the stereo audio signal is generated to create the left-to-right spatial dimension, along with a reverb or echo effect to generate the vertical dimension. Such spatial dimensionality can be generated using a variety of techniques known in the art, including, for example, a head-related transfer function that both filters the audio signal and generates a time shift.

Once the modified audio signal is generated, the modified audio signal can be provided to speakers or headphone or another playback device coupled to the attendee site computer (735). This can typically be performed through use of a sound card or the like attached or embodied in the attendee site computer.

In addition to providing a stereo audio sound to link the current presenter with their image, the attendee window can provide other indicia of the current presenter. For example, the current presenter's image or name can be highlighted in the attendee window (740). Alternatively, the current presenter's image can be moved to the "stage" in the attendee's window (e.g., current presenter 450 in FIG. 4). Receipt of the audio signal and adjusting the audio and visual display accordingly can continue until the end of the teleconference (745).

When the teleconference ends, the attendee window can optionally save the attendee image locations (750), so that when the same set of attendees attends a future teleconference, the locations can be reused without having to manually set them up. The attendee window can be cleared of all user images (755) and the teleconference can be disconnected (760). Termination of the teleconference can be initiated remotely (e.g., by a signal from the teleconferencing server) or locally (e.g., by hanging up the phone or indicating termination through an input).

Figure 8:
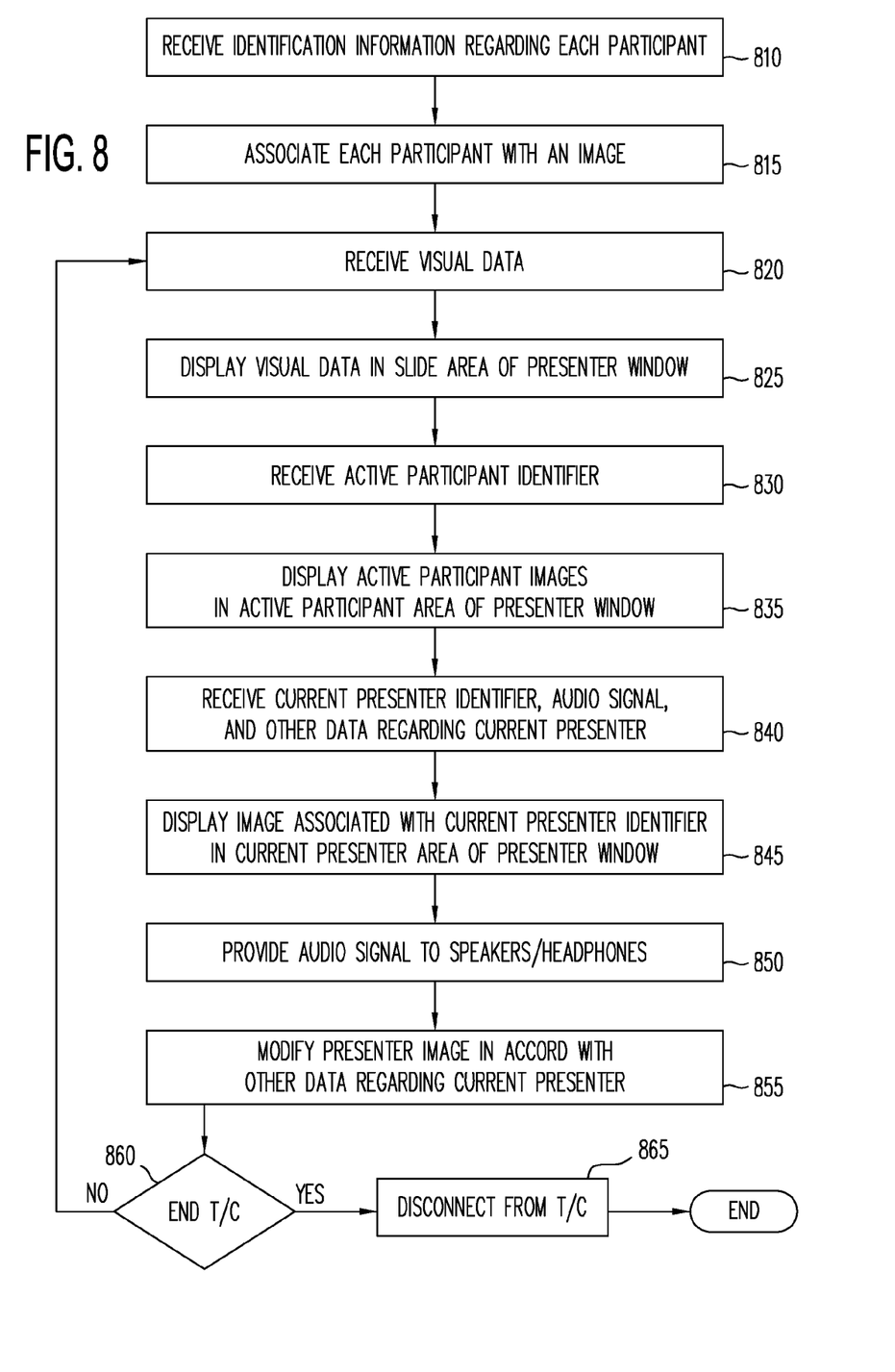
FIG. 8 is a simplified flow diagram illustrating steps performed by a teleconference environment displaying a presenter window, in accord with embodiments of the present invention.

FIG. 8 is a simplified flow diagram illustrating steps performed by a teleconference environment displaying a presenter window, in accord with embodiments of the present invention. After a teleconference has been established, the teleconference environment at an attendee site computer receives identification information regarding each attendee to the teleconference from the teleconference server (810). The teleconference environment can then associate each identified attendee with an image (815). This can be done automatically, by referencing a local or remote database that includes images chosen by either the attendees themselves or the local attendee to correlate with the identified attendees.

Visual data can be received from the teleconference server (820). As discussed above, this visual data can be associated with slides, postscript files, picture files, desktop images, and the like, as provided by the teleconference presenter to the teleconferencing server. The visual data can then be displayed in the presentation area (e.g., presentation area 510) of the presenter window (e.g., presenter window 500).

Identification data associated with active participants can be received from the teleconference server (830). Active participant images can then be displayed in an active participant area of the presenter window (e.g., active participant area 520) (835). In addition, audio data can be received from the teleconference server along with a current presenter identifier and other data regarding the current presenter (840). As discussed above, the current presenter and active participants are determined by the teleconferencing server using a combination of thresholds. An image associated with the identified current presenter can be displayed in a current presenter area of the presenter window (e.g., current presenter area 530) (845). The audio signal can be provided to speakers, headphones, or other playback device coupled to the attendee site computer (850). As with the attendee window, the audio signal can be provided as a spatially-enhanced stereo signal, or as a monaural signal. Since the presenter window provides visual cues as to who the current presenter is, it is not necessary for a spatially-enhanced audio signal to be provided for identification cues. In addition, the presenter image can be modified in accord with the other data received (e.g., input device motion data received from the current presenter) to further enhance understanding of the presentation (e.g., pointing to the currently discussed section of presentation area 510).

As the teleconference continues identification information regarding currently active participants and the current presenter can change, along with changes of the visual data. The teleconference environment will modify the presenter window accordingly as the teleconference continues. Once the teleconference ends (860), the teleconference environment will disconnect from the teleconference (865), as discussed above with regard to the attendee window.

Embodiments of the present invention can provide one or both of the attendee window and presenter window, as discussed above. In the case of using both the attendee window and the presenter window, as an attendee is promoted to active participant or current presenter, the spatially-enhanced audio can move the perceived sound from the attendee window to the presenter window in order to aid in the listening attendee in understanding who is speaking. This further enhances the artificial conference environment provided by the current invention, and the human interpretable cues offered.

By now it should be appreciated that there has been provided a teleconference system that includes an attendee site node, coupled via a network to a teleconference server that is coupled to a plurality of remote attendee site nodes. The attendee site node includes a network interface and a processor coupled to the network interface. The network interface is configured to receive audio information from the teleconference server and to receive current speaker identification information from the teleconference server. The audio information corresponds to an audio signal originating from an originating attendee site node that is a member of the plurality of remote attendee site nodes. The current speaker information is associated with the originating attendee site node. The processor is configured to associate the current speaker identification information with a first image stored in a memory coupled to the processor, display the first image at a first selected location in an attendee area on a display coupled to the processor, generate a modified audio signal from the audio information, and apply the modified audio signal to a playback device coupled to the processor. The modified audio signal is generated to sound as if it is originating from a spatial location corresponding to the first selected location when emitted from the playback device.

In one aspect of the above embodiment, the attendee site node is further configured to receive attendee information for each attendee of a teleconference from the teleconference server, associate the attendee information for each attendee with a corresponding image, and display the corresponding images corresponding to each attendee at corresponding locations in the attendee area. The attendee information is associated with each originating remote attendee site node. In a further aspect, each attendee site node is further configured to automatically select the corresponding selected locations for display of the images corresponding to each attendee. In a still further aspect the attendee site node is further configured to provide a user-initiated mechanism for moving an image of an attendee to a user-selected location.

In another aspect of the above embodiment, the attendee site node is further configured to receive second audio information from the teleconference server by the network interface, receive second current speaker identification information from the teleconference server, generate a second modified audio signal from the second audio information, and apply the second modified audio signal to the playback device. The second audio information corresponds to a second audio signal originating from a second originating attendee site node. The second current speaker identification information is associated with the second originating attendee site node. The second modified audio signal is generated to sound as if it is originating from a spatial location corresponding to the corresponding selected location associated with the image associated with the attendee associated with the second current speaker. In a further aspect, the attendee site node is further configured to display the images corresponding to each attendee in one or more of rows or groupings in the attendee area, and display the first image in a stage area of the attendee window wherein the stage area is center and to the bottom of the attendee area. In a still further aspect, the attendee site node is further configured to display, by the processor, a second image in the stage area. The second image corresponds to the image associated with the attendee associated with the second current speaker. The second image either replaces the first image, or is added to the first image in the stage area.

In another aspect of the above embodiment, the attendee site node is further configured to receive visual data from the teleconference server by the network interface, and display the visual data, by the processor, in a slide area of a presenter area on the display where the presenter area is distinct from the attendee area. In a further aspect, the visual data corresponds to image data provided by the originating attendee site node. In a still further aspect, the visual data is one of a slide, a postscript file, a picture file, and a desktop image. In another aspect, the attendee site node processor is further configured to select an avatar image corresponding to the current speaker identification information and display the avatar in a current presenter area of the presenter area. The avatar image is stored in memory of the attendee site node. The current presenter area of the presenter area is displayed next to the slide area of the presenter area. In a further aspect, the attendee site node is further configured to receive gestural input information from the teleconference server by the network interface and modify the avatar display in response to the gestural input information. The gestural input information is associated with the originating attendee site node. In a still further aspect, the gestural input information corresponds to input data generated by a user of the originating attendee site node manipulating an input device over a location on an image of the visual data, and the modifying of the avatar display in response to the gestural input information provides a visual cue from the avatar to the corresponding location of the slide area in the presenter area.

Another embodiment of the teleconference system provides an attendee site node, coupled via a network to a teleconference server that is coupled to a plurality of remote attendee site nodes. The attendee site node includes a network interface and a processor coupled to the network interface. The network interface is configured to receive audio information from the teleconference server, receive visual data from the teleconference server, and receive current speaker identification information from the teleconference server. The audio information corresponds to an audio signal originated from an originating attendee site node that is a member of the plurality of remote attendee site nodes. The current speaker identification information is associated with the originating attendee site node. The processor is configured to display the visual data in a slide area of a presenter window on a display coupled to the processor, associate the current speaker identification information with a first image stored in a memory coupled to the processor, display the first image in a current presenter area of the presenter window, generate an audio signal from the audio information, and apply the audio signal to a playback device coupled to the processor. The current presenter area of the presenter window is displayed next to the slide area of the presenter window.

In one aspect of the above embodiment, the attendee site node is further configured to receive active participant information corresponding to active participants of the teleconference from the teleconference server via the network interface. The active participants of the teleconference are selected from all attendees of the teleconference in response to exceeding a threshold of participation in the teleconference. In a further aspect, the threshold of participation in the teleconference correlates with one or more of frequency of speaking and amount of time speaking. In another further aspect, the attendee site node is further configured to associate the active participant information for each active participant with a corresponding image, and display the corresponding images in an active participant area of the participant window. In a still further aspect, the attendee site node is further configured to receive active participant audio information from the teleconference server, generate a modified audio signal from the active participant audio information, and apply the modified audio signal to a playback device coupled to the processor. The active participant audio information corresponds to an audio signal originated from an attendee site node corresponding to an active participant. The modified audio signal is generated to sound as if it is originating from a spatial location corresponding to the active participant area when emitted from the playback device.

Another embodiment of the present invention provides a teleconference system that includes one or more attendee site nodes configured to transmit and receive teleconference information over a network coupled to each attendee site node, and a teleconference server coupled to the network by one or more network interfaces. The teleconference server is configured to: receive one or more of audio data and visual data from an originating attendee site node; transmit the one or more of audio data and visual data to each other of the attendee site nodes; identify the originating attendee site node; transmit an identification of the originating attendee site node to each other of the attendee site nodes; rank each attendee site node as one of an attendee, an active participant by virtue of audio data originating from that attendee site node in excess of a first threshold, or a current presenter by virtue of audio data originating from that attendee site node in excess of a second threshold; and, transmit the rank of each attendee site node to each of the one or more attendee site nodes.

In one aspect of the above embodiment, the teleconference system further includes a telephone network coupling one or more of the attendee site nodes to the teleconference server and configured to transport audio data from the attendee site nodes to the teleconference server, and the teleconference server is further configured to identify the originating site node of audio data received over the telephone network.

By now it should be appreciated that there has been provided a teleconference system that includes an attendee site node that is coupled via a network to a teleconference server coupled to a plurality of remote attendee site nodes.

The attendee site node includes a network interface and a processor coupled to the network interface. The network interface is configured to receive audio information from the teleconference server wherein the audio information corresponds to an audio signal originating from an originating attendee site node that is a member of the plurality of remote attendee site nodes, and receive current speaker identification information from the teleconference server wherein the current speaker identification information is associated with the originating attendee site node. The processor is configured to associated the current speaker identification information with a first image stored in a memory coupled to the processor, display the first image at a first selected location in an attendee area on a display coupled to the processor, generate a modified audio signal from the audio information, and apply the modified audio signal to a playback device coupled to the processor. The modified audio signal is generated to sound as if it is originating from a spatial location corresponding to the first selected location when emitted from the playback device.

In one aspect of the above embodiment, the attendee site node is further configured to receive attendee identification information for each attendee of a teleconference from the teleconference server by the network interface, associate the attendee identification information for each attendee with a corresponding image, and display the corresponding images corresponding to each attendee at corresponding selected locations in the attendee area. The attendee identification information is associated with each originating remote attendee site node. In a further aspect, the attendee site node is further configured to automatically select the corresponding selected locations for display of the images corresponding to each attendee. In a still further aspect, the attendee site node is further configured to provide a user initiated mechanism for moving an image of an attendee to a user-selected location.

In another aspect of the above embodiment, the attendee site node is further configured to receive second audio information from the teleconference server by the network interface wherein the second audio information corresponds to a second audio signal originated from a second originating attendee site node, receive second current speaker identification information from the teleconference server where the second current speaker identification information is associated with the second originating attendee site node, generate a second modified audio signal from the second audio information, and apply the second modified audio signal to the playback device where the second modified audio signal is generated to sound as if it is originating from a spatial location corresponding to the corresponding selected location associated with the image associated with the attendee associated with the second current speaker. In a further aspect, the attendee site node is further configured to display the images corresponding to each attendee in one or more rows or groupings in the attendee area, and display the first image in a stage area of the attendee window where the stage area is center and to the bottom of the attendee area. In a yet further aspect, the attendee site node is further configured to display a second image in the stage area where the second image corresponds to the image associated with the attendee associated with the second current speaker, and the second image either replaces the first image or is added to the first image in the stage area.

In another aspect of the above embodiment, the attendee site node is further configured to receive visual data from the teleconference server, and display the visual data in a slide area of a presenter area on the display where the presenter area is distinct from the attendee area. In a further aspect, the visual data corresponds to image data provided by the originating attendee site node. In a still further aspect, the visual data can be one of a slide, a postscript file, a picture file, and a desktop image. In another aspect, he attendee site node processor is further configured to select an avatar image corresponding to the current speaker identification information where the avatar image is stored in the memory, and display the avatar in a current presenter area of the presenter area, where the current presenter area of the presenter area is displayed next to the slide area of the presenter area. In a still further aspect, the attendee site node is further configured to receive gestural input information from the teleconference server where the gestural input information is associated with the originating attendee site node, and modify the avatar display in response to the gestural input information. In yet a further aspect, the gestural input information corresponds to input data generated by a user of the originating attendee site node manipulating an input device over a location on an image of the visual data, and said modifying the avatar display provides a visual cue from the avatar to the corresponding location of the slide area in the presenter area.

Another embodiment provides a teleconference system that includes an attendee site node coupled via a network to a teleconference server coupled to a plurality of remote attendee site nodes. The attendee site node includes a network interface and a processor coupled to the network interface. The network interface is configured to: receive audio information from the teleconference server where the audio information corresponds to an audio signal originating from an originating attendee site node that is a member of the plurality of remote attendee site nodes; receive visual data from the teleconference server; and, receive current speaker information from the teleconference server where the current speaker identification information is associated with the originating attendee site node. The processor is configured to: display the visual data in a slide area of a presenter window on a display coupled to the processor; associate the current speaker identification information with a first image stored in a memory coupled to the processor; display the first image in a current presenter area of the presenter window where the current presenter area of the presenter window is displayed next to the slide area of the presenter window; generate an audio signal from the audio information; and, apply the audio signal to a playback device coupled to the processor.

In one aspect of the above embodiment, the attendee site node is further configured to receive active participant information corresponding to active participants of the teleconference, where the active participants of the teleconference are selected from all attendees of the teleconference in response to exceeding a threshold of participation in the teleconference. In a further aspect, the threshold of participation in the teleconference correlates with one or more of frequency of speaking and amount of time speaking. In another further aspect, the attendee site node is further configured to associate the active participant information for each active participant with a corresponding image, and display the corresponding images in an active participant area of the participant window. In a still further aspect, the attendee site node is further configured to receive active participant audio information from the teleconference server, generate a modified audio signal from the active participant audio information, and apply the modified audio signal to a playback device coupled to the processor. The active participant audio information corresponds to an audio signal originated from an attendee site node corresponding to an active participant. The modified audio signal is generated to sound as if it is originating from a spatial location corresponding to the active participant area when emitted from the playback device.

Another embodiment provides a teleconference system that includes one or more attendee site nodes and a teleconference server. The attendee site nodes are configured to transmit and receive teleconference information over a network coupled to each attendee site node. The teleconference server is coupled to the network by one or more network interfaces. The teleconference server is configured to receive one or more of audio data and visual data from an originating attendee site node of the one or more attendee site nodes, transmit the one or more of audio data and visual data to each other of the attendee site nodes, identify the originating attendee site node, transmit an identification of the originating attendee site node to each other of the attendee site nodes, rank each attendee site node as one of an attendee, an active participant by virtue of audio data originating from that attendee site node in excess of a first threshold, or a current presenter by virtue of audio data originating from that attendee site node in excess of a second threshold, and transmit the rank of each attendee site node to each of the one or more attendee site nodes.

In one aspect of the above embodiment, the teleconference system further includes a telephone network coupling one or more of the attendee site nodes to the teleconference server and configured to transport audio data from the attendee site nodes to the teleconference server, and the teleconference server further configured to identify the originating site node of audio data received over the telephone network.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A teleconference system comprising:
   an attendee site node, coupled via a network to a teleconference server coupled to a plurality of remote attendee site nodes, and comprising
      a network interface configured to
         receive audio information from the teleconference server wherein the audio information corresponds to an audio signal originating from an originating attendee site node that is a member of the plurality of remote attendee site nodes,
         receive current speaker identification information from the teleconference server wherein the current speaker identification information is associated with the originating attendee site node,
         receive visual data from the teleconference server and
         receive gestural input information from the teleconference server, by the network interface, wherein the gestural input information is associated with the originating attendee site node, and the gestural input information corresponds to input data generated by a user of the originating attendee site node manipulating an input device over a location on an image of the visual data; and
      a processor coupled to the network interface and configured to
         associate the current speaker identification information with a first image stored in a memory coupled to the processor,
         display the first image at a first selected location in an attendee area on a display coupled to the processor,
         generate a modified audio signal from the audio information, and
         apply the modified audio signal to a playback device coupled to the processor, wherein the modified audio signal is generated to sound as if it is originating from a spatial location corresponding to the first selected location when emitted from the playback device,
         display the visual data in a slide area of a presenter area on the display wherein the presenter area is distinct from the attendee area,
         select an avatar image corresponding to the current speaker identification information wherein the avatar image is stored in the memory,
         display the avatar in a current presenter area of the presenter area, wherein the current presenter area of the presenter area is displayed next to the slide area of the presenter area,
         modify the avatar display in response to the gestural input information to provide a visual cue from the avatar to the corresponding location of the slide area in the presenter area.

2. The teleconference system of claim 1 wherein the attendee site node is further configured to
   receive attendee identification information for each attendee of a teleconference, from the teleconference server by the network interface, wherein the attendee identification information is associated with each originating remote attendee site node;
   associate the attendee identification information for each attendee with a corresponding image; and
   display the corresponding images corresponding to each attendee at corresponding selected locations in the attendee area.

3. The teleconference system of claim 2 wherein the attendee site node is further configured to
   automatically select the corresponding selected locations for display of the images corresponding to each attendee.

4. The teleconference system of claim 3 wherein the attendee site node is further configured to provide a user initiated mechanism for moving an image of an attendee to a user-selected location.

5. The teleconference system of claim 2 wherein the attendee site node is further configured to
   receive second audio information from the teleconference server by the network interface wherein the second audio information corresponds to a second audio signal originated from a second originating attendee site node;
   receive second current speaker identification information from the teleconference server wherein the second current speaker identification information is associated with the second originating attendee site node;
   generate a second modified audio signal from the second audio information; and apply the second modified audio signal to the playback device wherein the second modified audio signal is generated to sound as if it is originating from a spatial location corresponding to the corresponding selected location associated with the image associated with the attendee associated with the second current speaker.

6. The teleconference system of claim 5 wherein the attendee site node is further configured to display the images corresponding to each attendee in one or more of rows or groupings in the attendee area; and display the first image in a stage area of the attendee window wherein the stage area is center and to the bottom of the attendee area.

7. The teleconference system of claim 6 wherein the attendee site node is further configured to display, by the processor, a second image in the stage area, wherein the second image corresponds to the image associated with the attendee associated with the second current speaker, and the second image either replaces the first image or is added to the first image in the stage area.

8. The teleconference system of claim 1 wherein the visual data corresponds to image data provided by the originating attendee site node.

9. The teleconference system of claim 8 wherein the visual data is one of a slide, a postscript file, a picture file, and a desktop image.

* * * * *